(12) United States Patent
Kaplan et al.

(10) Patent No.: US 6,819,008 B2
(45) Date of Patent: Nov. 16, 2004

(54) METHOD FOR OPERATING A SWITCHED RELUCTANCE ELECTRICAL GENERATOR USING DATA MAPPING

(75) Inventors: Martin Kaplan, Avon, CT (US); James M. Kokernak, Niskayuna, NY (US); Erkan Meese, Izmit (TR); Yilmaz Sozer, Troy, NY (US); David A. Torrey, Ballston Spa, NY (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/203,170

(22) PCT Filed: Feb. 9, 2001

(86) PCT No.: PCT/US01/04302

§ 371 (c)(1),
(2), (4) Date: Aug. 7, 2002

(87) PCT Pub. No.: WO01/59922

PCT Pub. Date: Aug. 16, 2001

(65) Prior Publication Data

US 2003/0011347 A1 Jan. 16, 2003

Related U.S. Application Data

(60) Provisional application No. 60/181,268, filed on Feb. 9, 2000.

(51) Int. Cl.$^7$ .............................. H02P 9/48; H02P 9/00; H02P 8/00; H02K 23/00
(52) U.S. Cl. .............................. 290/44; 290/43; 290/7; 318/254; 318/701
(58) Field of Search .............................. 290/7, 43, 44; 318/254, 701

(56) References Cited

U.S. PATENT DOCUMENTS 3,967,173 A * 6/1976 Stich ........................... 318/811
4,739,240 A    4/1988 MacMinn et al. ............ 318/696
4,743,815 A * 5/1988 Gee et al. ..................... 318/254

(List continued on next page.)

FOREIGN PATENT DOCUMENTS

EP    0534761    9/1992

OTHER PUBLICATIONS

"The Control Of High–Speed Variable–Reluctance Generators In Electric Power Systems", IEEE Transactions On Industry Applications, vol. 29, No. 6, Nov./Dec. 1993 (pp. 1106–1109).

(List continued on next page.)

*Primary Examiner*—Joseph Waker
*Assistant Examiner*—Pedro J. Cuevas
(74) *Attorney, Agent, or Firm*—MacMillian, Sobanski & Todd, LLC

(57) ABSTRACT

A method for operating a switched reluctance electrical generator in a manner that is highly efficient involves initially performing a mapping technique to obtain data relating to all of the possible operating conditions of the generator system that generate the desired output power. This mapping technique can be performed empirically or by computer simulation. Then, the effective phase currents supplied to the windings on the stator are measured or calculated. Next, the optimum conduction angles can be selected as those turn-on angles and turn-off angles that occur using the smallest effective phase currents supplied to the windings on the stator. Lastly, the generator system is operated using the selected optimum turn-on and turn-off angles. If desired, a feedback loop can be provided for comparing the actual output power that is generated by the generator system with a desired reference output power level to insure that such actual output power is maintained at or near the desired output power. To accomplish this, the conduction angles can be adjusted in response to such comparison to increase or decrease the actual output power as necessary.

7 Claims, 9 Drawing Sheets

U.S. PATENT DOCUMENTS

| | | | |
|---|---|---|---|
| 5,140,243 A * | 8/1992 | Lyons et al. | 318/701 |
| 5,291,115 A * | 3/1994 | Ehsani | 318/701 |
| 5,448,149 A * | 9/1995 | Ehsani et al. | 318/701 |
| 5,469,039 A | 11/1995 | Stephenson et al. | 318/701 |
| 5,475,289 A * | 12/1995 | McLaughlin et al. | 318/432 |
| 5,545,964 A | 8/1996 | Stephenson et al. | 318/701 |
| 5,563,488 A | 10/1996 | Stephenson et al. | 318/701 |
| 5,638,265 A * | 6/1997 | Gabor | 363/89 |
| 5,677,607 A * | 10/1997 | Sugiyama et al. | 318/439 |
| 5,694,010 A * | 12/1997 | Oomura et al. | 318/254 |
| 5,705,918 A | 1/1998 | Davis | 322/94 |
| 5,796,226 A * | 8/1998 | Ookawa et al. | 318/254 |
| 5,841,262 A * | 11/1998 | Tang | 318/701 |
| 5,936,386 A | 8/1999 | Heglund | 322/94 |
| 5,969,962 A * | 10/1999 | Gabor | 363/89 |
| 6,008,601 A * | 12/1999 | Sugiyama | 318/254 |
| 6,011,377 A * | 1/2000 | Heglund et al. | 318/701 |
| 6,051,942 A | 4/2000 | French | 318/254 |
| 6,150,778 A * | 11/2000 | Morris | 318/254 |
| 6,153,993 A * | 11/2000 | Oomura et al. | 318/434 |
| 6,157,160 A * | 12/2000 | Okawa et al. | 318/701 |
| 6,191,676 B1 * | 2/2001 | Gabor | 336/160 |
| 6,285,148 B1 * | 9/2001 | Sugiyama | 318/254 |
| 6,288,514 B1 * | 9/2001 | Direnzo et al. | 318/701 |
| 6,472,842 B1 * | 10/2002 | Ehsani | 318/701 |
| 6,509,710 B2 * | 1/2003 | Grasso et al. | 318/701 |
| 6,593,720 B2 * | 7/2003 | Omekanda | 318/701 |
| 6,650,082 B1 * | 11/2003 | Du | 318/701 |
| 6,683,427 B2 * | 1/2004 | Desbiolles et al. | 318/254 |
| 6,683,428 B2 * | 1/2004 | Pavlov et al. | 318/432 |
| 6,707,265 B2 * | 3/2004 | Imai et al. | 318/254 |
| 6,707,266 B2 * | 3/2004 | Nakazawa | 318/432 |
| 6,710,559 B2 * | 3/2004 | Yasohara et al. | 318/254 |
| 6,710,564 B2 * | 3/2004 | Shibuya et al. | 318/439 |
| 6,724,162 B2 * | 4/2004 | van der Linde et al. | 318/254 |
| 6,724,168 B2 * | 4/2004 | Cheong et al. | 318/701 |
| 6,734,646 B2 * | 5/2004 | Aiello et al. | 318/254 |
| 6,737,820 B2 * | 5/2004 | Witzig | 318/254 |
| 6,747,426 B2 * | 6/2004 | Katsu et al. | 318/254 |
| 6,753,663 B2 * | 6/2004 | Jung et al. | 318/3 |
| 6,756,749 B2 * | 6/2004 | Haas et al. | 318/34 |
| 6,756,757 B2 * | 6/2004 | Marcinkiewicz et al. | 318/432 |
| 6,762,574 B2 * | 7/2004 | Kurosawa et al. | 318/254 |
| 6,771,035 B2 * | 8/2004 | Heidrich | 318/254 |

OTHER PUBLICATIONS

"A New Energy Optimizing Control Strategy For Switched Reluctance Motors", IEEE Transactions On Industry Applications, vol. 31, No. 5, Sep./Oct. 1995 (pp. 1088–1095).

"A Switched Reluctance Drive For Electric Vehicles With Optimized Efficiency In Each Working Point", EVS–15, International Electrical Vehicle Symposium, Sep./Oct. 1998.

"Simulation Of An Excitation Scheme To Reduce Torque Of Switched Reluctance Motor Based On 2D–FEM Field Calculations", International Conference On Electrical Machines, Sep., 1998 (pp. 2128–2130).

* cited by examiner

METHOD FOR OPERATING A SWITCHED RELUCTANCE ELECTRICAL GENERATOR USING DATA MAPPING

CROSS REFERENCE TO RELATED APPLICATION

This application claims the benefit of U.S. Provisional Application No. 60/181,268, filed Feb. 9, 2000, the disclosure of which is incorporated herein by reference.

BACKGROUND OF THE INVENTION

This invention relates in general to electrical machines and in particular to an improved method for operating a switched reluctance electrical generator in an optimum manner to achieve high efficiency.

Electrical machines can be generally categorized as being either motors, which convert electrical energy to mechanical energy (rotary mechanical energy, for example), or generators, which convert mechanical energy to electrical energy. Generally speaking, electrical motors convert electrical energy to mechanical energy by establishing and controlling electromagnetic fields so as to cause the desired mechanical motion. Electrical generators, on the other hand, are generally responsive to the mechanical motion in the presence of these electromagnetic fields so as to cause the flow of electrical current. There are many different types of electrical machines, and the operating characteristics of such electrical motors and generators vary widely from type to type.

A reluctance machine is an electrical machine that produces torque as a result of the tendency of its movable part (typically referred to as a rotor) to move relative to its stationary part (typically referred to as a stator) in such a manner that the reluctance of a magnetic circuit between the rotor and the stator is minimized. Usually, the stator is provided with a plurality of opposed pairs of inwardly extending or salient poles, while the rotor is provided with a different plurality of opposed pairs of outwardly extending salient poles. Windings provided on the stator poles are selectively energized to create a rotating magnetic field, which attracts the rotor poles toward the stator poles and causes the rotor to rotate relative to the stator. In one type of reluctance machine, the energization of the phase windings occurs at a controlled frequency. This is generally referred to as a synchronous reluctance machine, which may be operated as either a motor or a generator. In a second type of reluctance machine, circuitry is provided for detecting the angular position of the rotor and for energizing the phase windings as a function of the position of the rotor relative to the stator. This is generally referred to as a switched reluctance machine (or, in some instances, a variable reluctance machine), which may also be operated either as a motor or a generator.

Switched reluctance machines, operated either as motors or generators, are receiving increased attention with the improvements of power electronics technology and machine design. Some of the advantages of switched reluctance machines include the absence of windings or permanent magnets on the rotor, durability, the lack of brushes or other mechanical commutation structures, and the independence of the phases. These advantages can make the use of switched reluctance machines more efficient and less expensive in some applications.

The efficiency of any electrical machine (i.e., the ratio of the output mechanical energy generated by the motor to the input electrical energy supplied thereto, or vice versa in the case of a generator) is an important consideration in any application. However, when used in an automotive or other vehicular application, the efficiency of the electric motor is very important because it can have an impact on the fuel economy or battery life of the vehicle. Thus, it would be desirable to provide an improved method for operating an electrical machine, such as a switched reluctance electrical generator, in a manner that is highly efficient.

SUMMARY OF THE INVENTION

This invention relates to an improved method for operating a switched reluctance electrical generator in a manner that is highly efficient. Initially, a mapping technique is performed to obtain data relating to all of the possible operating conditions of the generator system that generate the desired output power. This mapping technique can be performed empirically or by computer simulation. Then, the effective phase currents supplied to the windings on the stator are measured or calculated. Next, the optimum conduction angles can be selected as those turn-on angles and turn-off angles that occur using the smallest effective phase currents supplied to the windings on the stator. Lastly, the generator system is operated using the selected optimum turn-on and turn-off angles. If desired, a feedback loop can be provided for comparing the actual output power that is generated by the generator system with a desired reference output power level to insure that such actual output power is maintained at or near the desired output power. To accomplish this, the conduction angles can be adjusted in response to such comparison to increase or decrease the actual output power as necessary.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
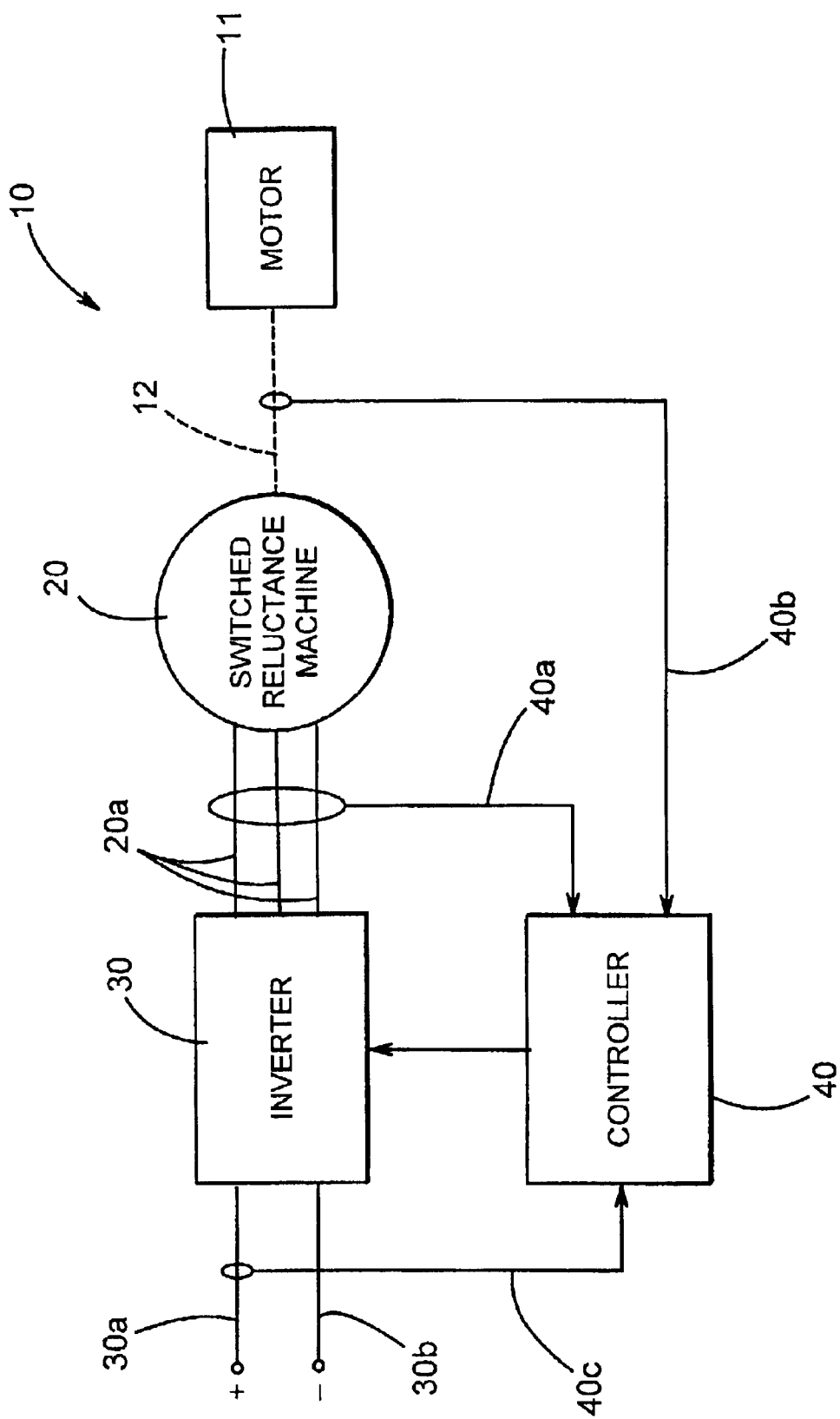
FIG. 1 is a block diagram of a conventional switched reluctance electrical generator system that can be operated in accordance with the method of this invention.

Referring now to the drawings, there is illustrated in FIG. 1 a block diagram of a conventional switched reluctance electrical generator system, indicated generally at 10, that can be operated in accordance with the method of this invention. The generator system 10 includes a conventional motor 11 or other source of rotary mechanical energy that is connected through a shaft 12 or similar structure to a switched reluctance machine 20. The structure and operation of the switched reluctance machine 20 will be explained in detail below. The switched reluctance machine 20 is electrically connected through a plurality of phase leads 20a to an inverter 30. The structure and operation of the inverter 30 will also be explained in detail below. The inverter 30 is electrically connected through a DC bus line 30a to a source of electrical energy (not shown). Lastly, the generator system to includes a controller 40 for controlling the operation of the inverter 30. To accomplish this, the controller 40 receives input signals over one or more lines 40a that are representative of the magnitude of the electrical currents in each of the phase leads 20a. The controller 40 also receives input signals over one or more lines 40b that are representative of the speed and the rotational position of a rotor (see FIG. 2) of the switched reluctance machine 20 relative to a stator (see FIG. 2) thereof. Lastly, the controller 40 receives input signals over one or more lines 40c that are representative of the magnitude of the voltage produced on the DC bus line 30a.

Figure 2:
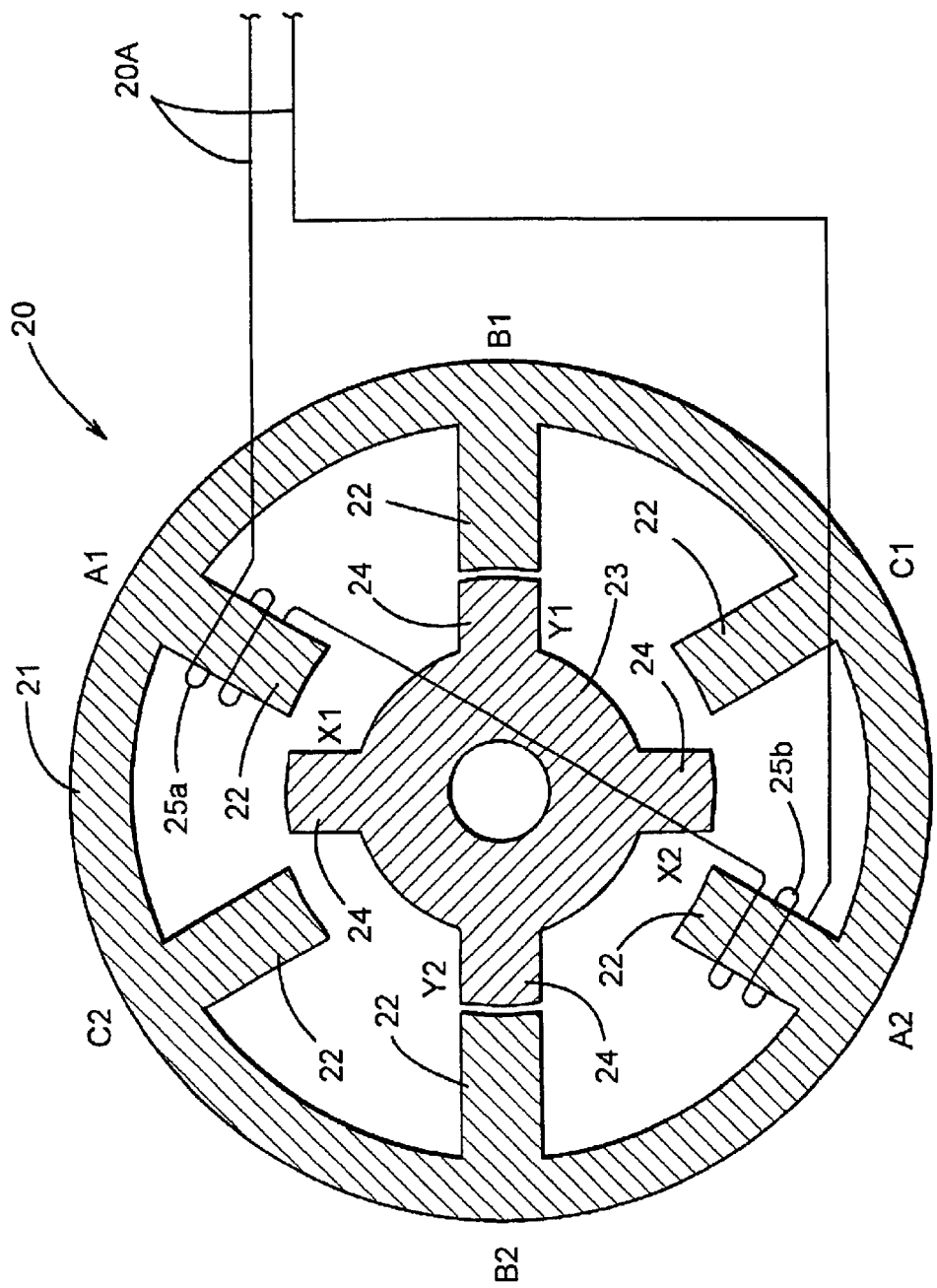
FIG. 2 is a sectional elevational view of the switched reluctance electrical machine for the generator system illustrated in FIG. 1.

The structure of the switched reluctance machine 20 is illustrated in detail in FIG. 2. Although this invention will be described in the context of the illustrated switched reluctance machine 20, it will be appreciated that the method of this invention may be practiced using any desired structure for the switched reluctance machine 20. As shown in FIG. 2, the switched reluctance machine 20 includes a stator 21 that is generally hollow and cylindrical in shape. A plurality of radially inwardly extending salient poles, indicated generally at 22, are formed on the stator 21 and extend longitudinally throughout the length thereof. The stator poles 22 are preferably provided in opposed pairs, such as shown in FIG. 2 at A1 and A2, B1 and B2, and C1 and C2. Thus, six stator poles 22 are provided on the illustrated stator 21. However, it is known in the art to provide the stator 21 with either a greater or lesser number of stator poles 22.

Each of the stator poles 22 is generally rectangular in radial cross sectional shape. The radially innermost surfaces of the stator poles 22 may be slightly curved so as to define an inner diameter. The stator 21 and the stator poles 22 are preferably formed from a magnetically permeable material, such as iron. As will be explained below, each of the stator pole pairs A1 and A2, B1 and B2, and C1 and C2 represents one phase for energizing the switched reluctance machine 20 for operation. Thus, the illustrated switched reluctance machine 20 has three electrical phases for energization. However, it is known to provide such a switched reluctance machine 20 with a greater or lesser number of electrical phases for energization. The stator 21 is preferably formed from a plurality of relatively thin laminations of a magnetically permeable material that are bonded or otherwise secured together in a manner that is well known in the art.

A cylindrical rotor 23 is co-axially supported within the stator 21 for relative rotational movement. The rotor 23 has a plurality of radially outwardly extending salient poles, indicated generally at 24, formed thereon. As with the stator poles 22, the rotor poles 24 extend longitudinally throughout the length of the rotor 23 and are preferably provided in opposed pairs, such as shown at X1 and X2 and Y1 and Y2. Thus, four rotor poles 24 are provided on the illustrated rotor 23. However, it is known in the art to provide the rotor 23 with either a greater or lesser number of rotor poles 24. Generally, the number of rotor poles 24 is different from the number of stator poles 22.

Each of the rotor poles 24 is generally rectangular in radial cross sectional shape. The radially outermost surfaces of the rotor poles 24 may be slightly curved so as to define an outer diameter. The outer diameter defined by the rotor poles 24 is preferably only slightly smaller than the inner diameter defined by the stator poles 22. Thus, a radial gap is defined between the stator poles 22 and the rotor poles 24 when they are aligned. The size of this radial gap is preferably relatively small. The rotor 23 and the rotor poles 24 are also preferably formed from a magnetically permeable material, such as iron. The rotor 23 is preferably also formed from a plurality of relatively thin laminations of a magnetically permeable material that are bonded or otherwise secured together in a manner that is well known in the art.

Figure 3:
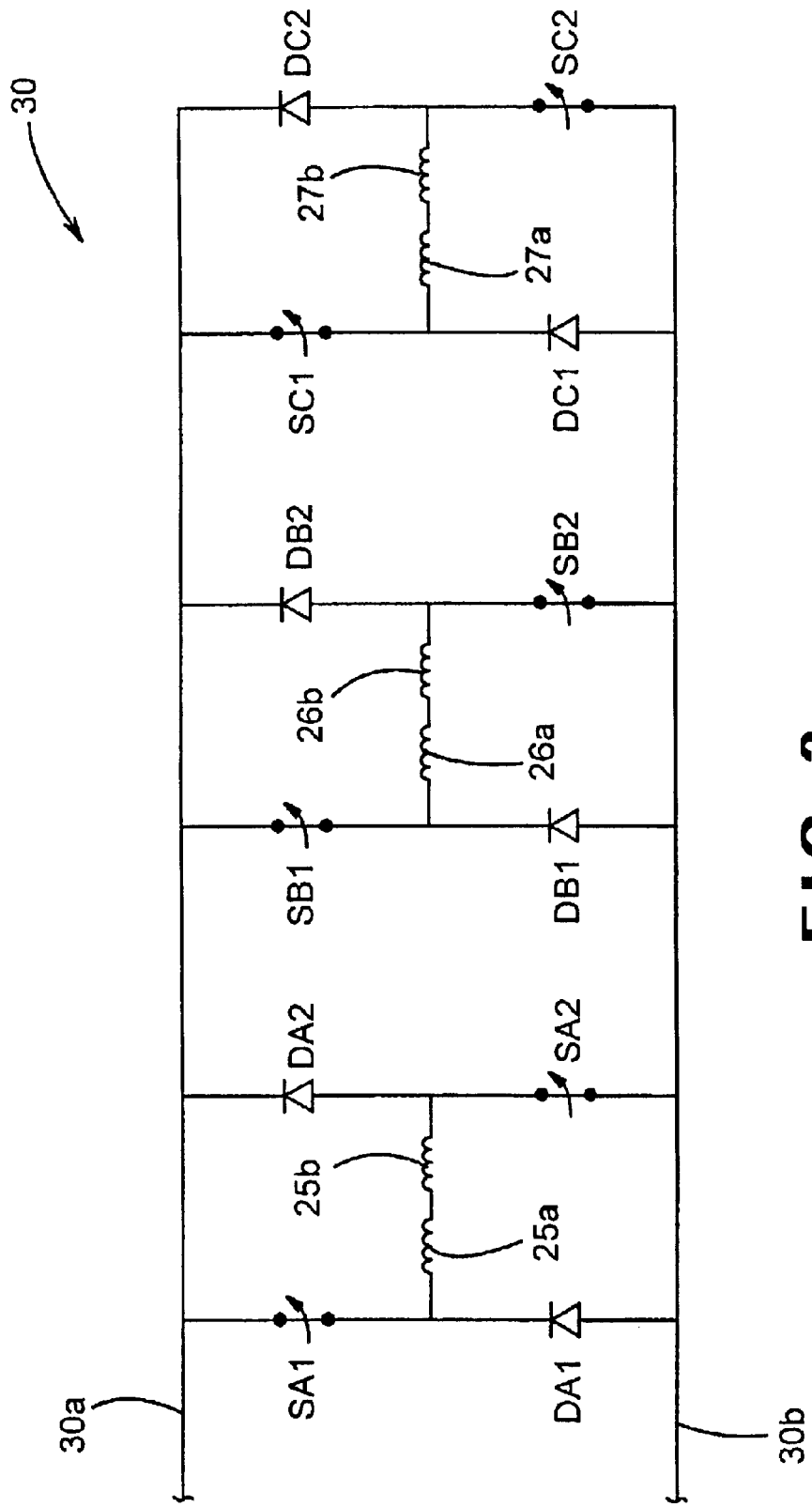
FIG. 3 is a block diagram of a preferred topology of a portion of a conventional power control circuit that can be used to operate the switched reluctance electrical generator system illustrated in FIGS. 1 and 2 in accordance with the method of this invention.

A winding of an electrical conductor is provided about each of the opposed pairs of the stator poles 22. As schematically shown in FIG. 2, first and second portions 25a and 25b of a first winding are provided on the opposed stator poles A1 and A2, respectively. The first and second portions 25a and 25b of the first winding are connected to the inverter 30, as shown in FIG. 3. Similarly, first and second portions 26a and 26b of a second winding are provided on the opposed stator poles B1 and B2, respectively, and first and second portions 27a and 27b of a third winding are provided on the opposed stator poles C1 and C2, respectively. The portions 26a, 26b and 27a, 27b of the second and third windings of the stator 21 are also connected to the inverter 30.

As shown in FIG. 3, the portions 25a and 25b of the first winding of the stator 21 are connected between the DC bus line 30a and a ground potential line 30b by a pair of switches SA1 and SA2 and a pair of diodes DA1 and DA2. Specifically, the switch SA1 is connected between the DC bus line 30a and the first portion 25a of the first winding, while the switch SA2 is connected between the second portion 25b of the first winding and the ground potential line 30b. The anode of the first diode DA1 is connected to the ground potential line 30b, while the cathode of the first diode DA1 is connected to the first portion 25a of the first winding. Similarly, the anode of the second diode DA2 is connected to the second portion 25b of the first winding, while the cathode of the second diode DA2 is connected to the DC bus line 30a. Switches SB1, SB2 and diodes DB1 and DB2 are provided in a similar manner for the first and second portions 26a and 26b of the second winding, and switches SC1, SC2 and diodes DC1 and DC2 are provided in a similar manner for the first and second portions 26a and 26b of the third winding.

The various switches of the inverter 30 are selectively opened and closed by the electronic controller 40 in response to the various input signals supplied thereto. Consequently, the various windings of the stator 21 are selectively energized as the rotor 23 is rotated relative thereto by the motor 11. The manner in which the various switches of the inverter 30 are selectively opened and closed is well known in the art and need not be repeated here in detail. However, to facilitate an understanding of the method of this invention, the operation of the switches SA1 and SA2 that are connected to the first and second portions 25a and 25b of the first winding will be briefly described.

Initially, the switches SA1 and SA2 (which typically are embodied as electronic semiconductor devices) are closed to allow current to flow from a source of DC voltage (not shown) through the DC bus line 30a to energize the first and second portions 25a and 25b of the stator winding. These switches SA1 and SA2 are closed at a turn-on angle that can be defined by a predetermined angular relationship of the rotor 23 relative to the stator 21. Typically, the turn-on angle occurs as a pair of the rotor poles 24, such as poles X1 and X2, start to become aligned with the stator poles 22, such as poles A1 and A2, that are to be energized. When both of the switches SA1 and SA2 are closed, electrical current starts to flow through the portions 25a and 25b of the first winding and increases over time.

When the rotor poles X1 and X2 become aligned with the energized stator poles A1 and A2, the reluctance between the rotor poles X1 and X2 and the stator poles A1 and A2 reaches a minimum. At the same time, the inductance of the first and second portions 25a and 25b of the stator winding reaches a maximum. Further rotation of the rotor 23 relative to the stator 21 by the motor 11 causes the rotor poles X1 and X2 become gradually mis-aligned with the energized stator poles A1 and A2. As a result, the inductance of the first and second portions 25a and 25b of the stator winding begins to decrease, which results in a rapidly increasing current through the portions 25a and 25b of the first winding. At a second predetermined angular orientation of the rotor 23 relative to the stator 21 (referred to as the turn-off angle), the switches SA1 and SA2 are opened. As a result, current is returned to the DC bus line 30a through diodes DA1 and DA2. The angular extent of the rotation of the rotor 23 relative to the stator 21 from the turn-on angle (when the switches SA1 and SA2 are closed) to the turn-off angle (when the switches SA1 and SA2 are opened) is referred to as the conduction or excitation angle.

Because of the continuing decrease in the inductance, however, the current delivered to the DC bus line 30a continues to increase. However, once the rotor poles X1 and X2 have become unaligned with the stator poles A1 and A2, the inductance reaches a minimum value, at which it remains until the rotor and stator poles begin to come into alignment again. During this final period, the current delivered to the DC bus line 30a decays until it reaches zero. Overall, however, more current is generated during the decrease in inductance as the rotor poles X1 and X2 pull away from the energized stator poles A1 and A2 than is required to be supplied by the DC bus line 30a. Thus, a net generation of electric current occurs. The same process subsequently occurs with respect to the switches SB1 and SB2 for the portions 26a and 26b of the second winding on the stator poles B1 and B2, and with respect to the switches SC1 and SC2 for the portions 27a and 27b of the third winding on the stator poles C1 and C2. The structure and method of operation of the switched reluctance generator system 10 thus far described is conventional in the art.

As discussed above, the efficiency of any electrical machine is an important consideration in any application. This invention provides an improved method for operating the above-described switched reluctance generator system 10 in a manner that is highly efficient. To accomplish this, the method of this invention follows two basic premises. The first premise is that there is a group or continuum of conduction angles that will generate approximately the same amount of electrical current to the DC bus line 30a (and, therefore, approximately the same amount of output power from the generator system 10) for a given rotational speed of the rotor 23 and a given DC voltage applied to the windings on the stator 21 from the source of DC voltage. In other words, the output power generated by the switched reluctance generator system 10 remains relatively constant even though the turn-on and turn-off angles are varied, so long as such turn-on and turn-off angles remain within this group of conduction angles. The reason for this relatively constant output power is that each group of the conduction angles produces only a portion of the possible generator output. The same generator output can be obtained by extracting different portions of the overall generator capabilities. Those different portions are correlated with different sets of the conduction angles.

The second premise of the method of this invention is that by minimizing the magnitude of the effective (typically measured as the root-mean-squared) phase current that is supplied to the switched reluctance machine 20 during power generation, the overall efficiency of the switched reluctance generator system 10 is maximized. In other words, by minimizing the effective phase currents supplied to the windings of the stator 21 during generation, the difference between the input shaft power and the output electrical power delivered to the DC bus line 30a will be minimized. The minimization of these effective phase currents has several consequences, all of which serve to reduce the losses within the switched reluctance generator system 10 and, therefore, promote efficiency. First, minimizing the effective phase currents minimizes resistive heating in the various windings provided on the stator 21. Second, minimizing the effective phase currents implies minimizing the peak phase currents, which serves to minimize the losses within the stator 21 and the rotor 23. Third, minimizing the effective phase currents reduces losses resulting from operation of the various switches in the inverter 30.

Thus, in order to maximize the efficiency of the switched reluctance generator system 10 for a given output power, it would be desirable to select conduction angles that both (1) fall within the above-described group of conduction angles that will generate the desired amount of electrical current to the DC bus line 30a, and, therefore, the desired output power, and (2) minimize the amounts of the effective phase currents that are delivered to the windings on the stator 21 to achieve that desired output power. As suggested above, for any operating speed of the rotor 23, there is a group of conduction angles that generate essentially the same amount of current to the DC bus line 30a. Accordingly, the specific conduction angles that fall within this group and that result in the consumption of the least amount of effective excitation current to the windings on the stator 21 are considered to provide optimum operation of the switched reluctance generator system 10.

To determine what these specific conduction angles are, this invention contemplates that a mapping technique be performed that relates the generated amount of electrical current to the DC bus line 30a (and, therefore, the output power) to (1) the conduction angles for exciting the windings on the stator 21, (2) the DC bus voltage that is used to excite the windings on the stator 21, and (3) the rotational speed at which the rotor 23 is driven relative to the stator 21 by the motor 11. Since the goal of this mapping process is to achieve efficient operation, it is usually sufficient to consider only the average value of the generated amount of electrical current to the DC bus line 30a, rather than its instantaneous value. This is a legitimate simplification provided that the averaging is performed throughout one electrical cycle of the generator system 10 because this is the smallest incremental step over which the commanded conduction angles are effective. The map may, for example, be constructed for the following operating conditions of the switched reluctance machine 20:

1. for different rotor rotational speeds from 1000 rpm to 5000 rpm in 200 rpm increments;
2. for different DC excitation voltages from 275 v to 325 v in 25 v increments;
3. for different turn-on angles from −90 electrical degrees to 145 electrical degrees in 5 electrical degree increments; and
4. for different conduction angles from 90 electrical degrees to 180 electrical degrees in 5 electrical degree increments.

These specific operating conditions are intended to be illustrative of only one of a variety of parameters for the switched reluctance machine 20. Thus, it will be appreciated that the mapping technique of this invention may be used in conjunction with any desired parameters and, therefore, be constructed for operating conditions of the switched reluctance machine 20 other than those specifically set forth above.

Figure 4:
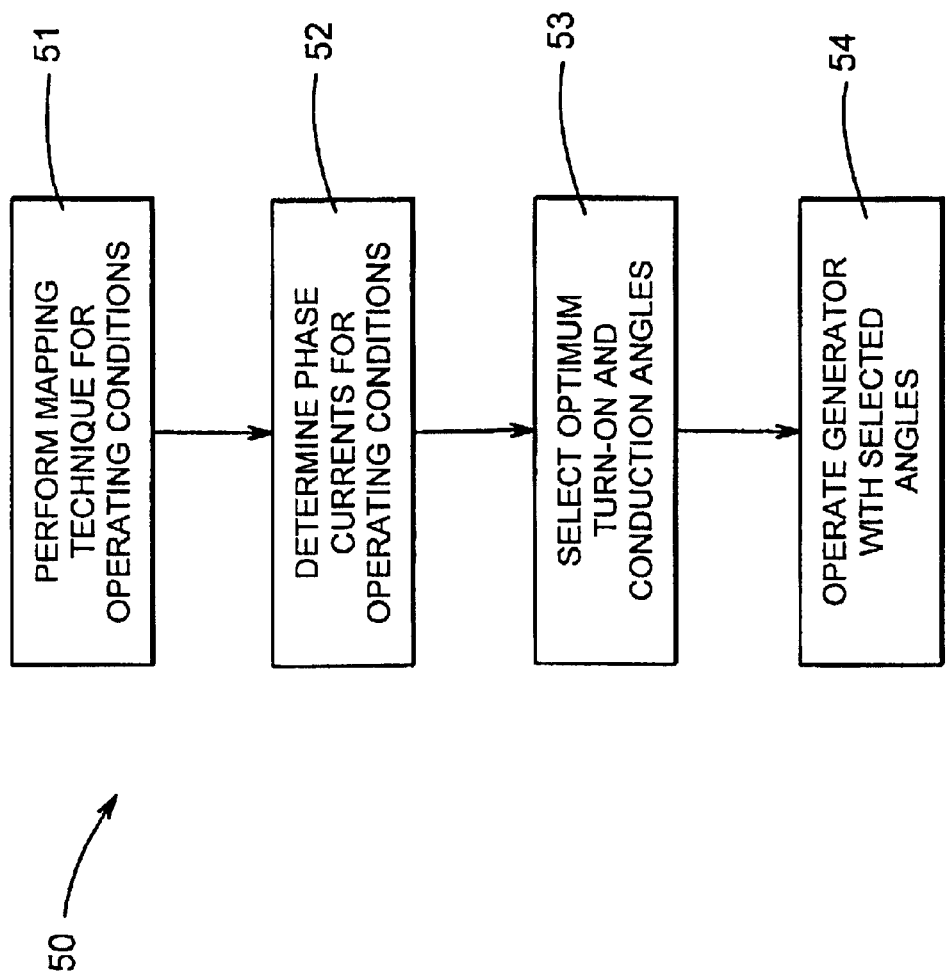
FIG. 4 is a flow chart of a first portion of a method in accordance with this invention for operating the switched reluctance electrical generator system illustrated in FIG. 1.

FIG. 4 is a flow chart, indicated generally at 50, that illustrates a first portion of a method in accordance with this invention for operating the switched reluctance electrical generator illustrated in FIG. 1 to perform this mapping technique. In a first step 51 of the method 50, the above-described mapping technique is initially performed to obtain data relating to all of the possible operating conditions of the generator system 10 (including the turn-on angles and the conduction angles at all of the possible rotational speeds of the rotor 23 relative to the stator 21) that generate the desired output power. This mapping technique can be performed empirically by repeated tests. However, it is likely that a relatively large number of experiments would likely be needed in order to generate an adequate map of all of the operating conditions that are likely to be encountered. Such a large number of empirical determinations may be somewhat impractical to perform. As an alternative, the above-described mapping technique can be accomplished by performing a series of computer simulations. Such computer simulations can be accomplished much faster than repeated empirical determinations.

In a second step 52 of the method 50 of this invention, the effective phase currents supplied to the windings on the stator 21 are measured (or, in the case of computer simulations, calculated). Then, in a third step 53 of the method 50, the optimum turn-on angles and the conduction angles are selected as those turn-on angles and the conduction angles that occur using the smallest effective phase currents supplied to the windings on the stator 21. Lastly, in a fourth step 54 of the method, the generator system 10 is operated using the selected optimum turn-on and turn-off angles.

Figure 5:
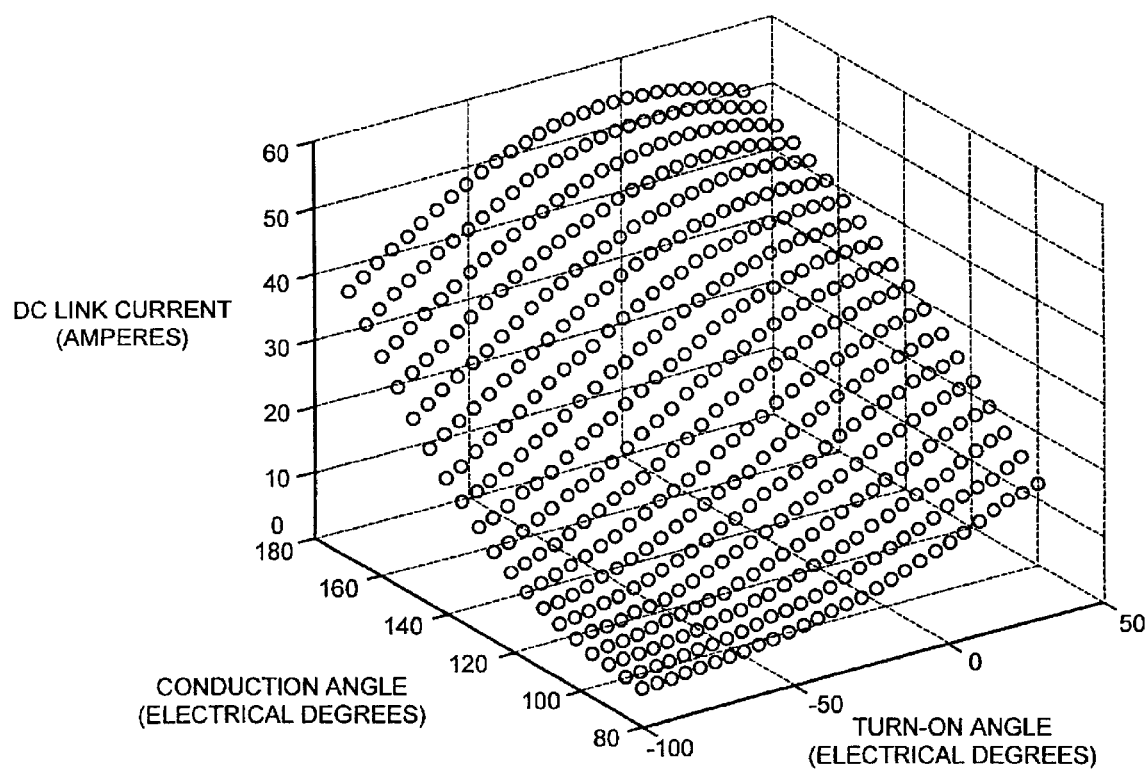
FIG. 5 is a graphical representation of a map constructed in accordance with the method of this invention that shows how the generated amount of electrical current varies with various turn-on angles and conduction angles for a particular rotational speed of the rotor relative to the stator.
Figure 6:
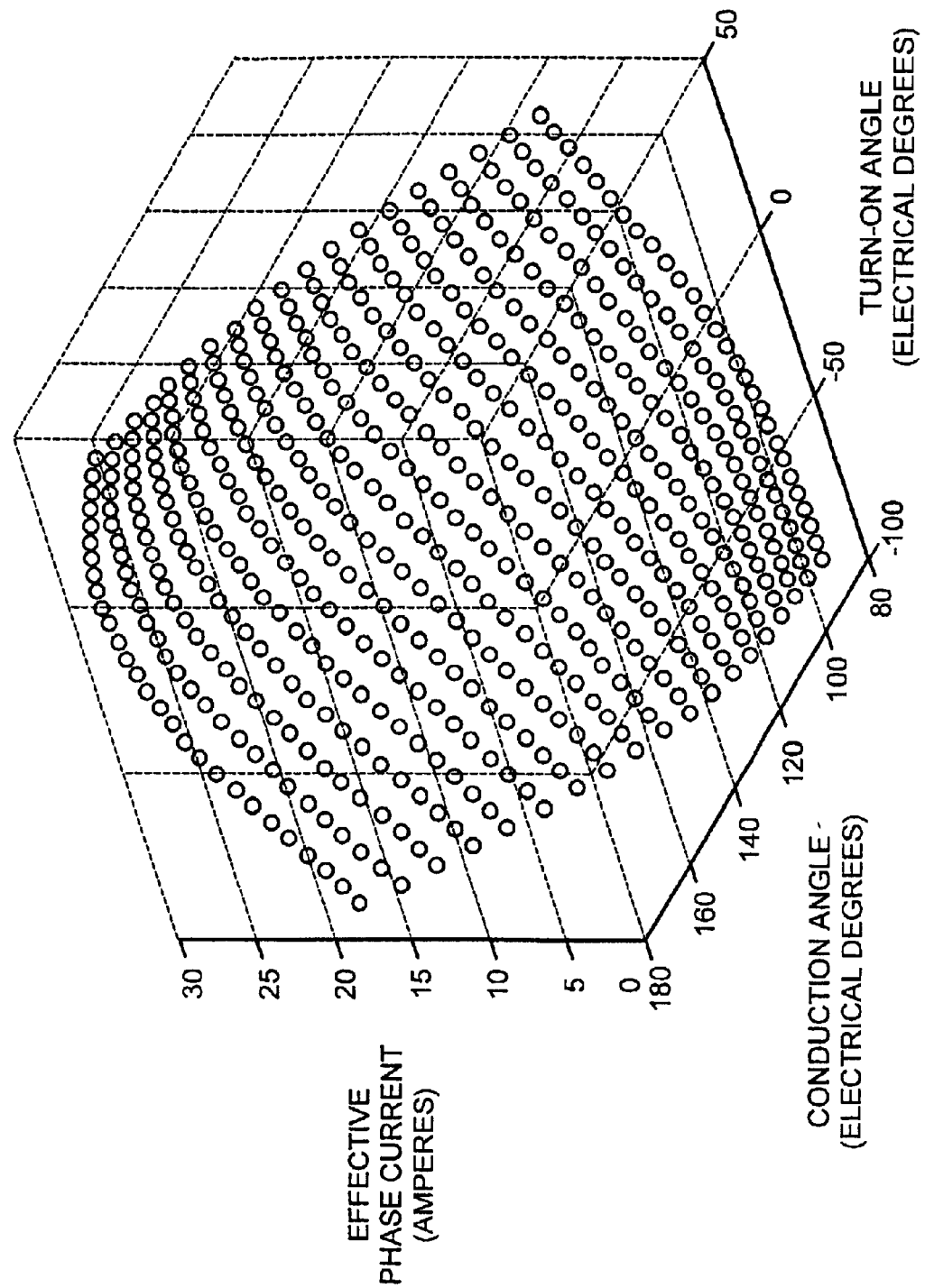
FIG. 6 is a graphical representation of a map constructed in accordance with the method of this invention that shows how the amount of the effective phase current varies with various turn-on angles and conduction angles for a particular rotational speed of the rotor relative to the stator.

FIG. 5 is a sample of a graphical representation of a map that has been constructed in accordance with the method of this invention to show how the generated amount of electrical current to the DC bus line 30a varies with various turn-on angles and conduction angles for a particular rotational speed of the rotor 23 relative to the stator 21 (3000 rpm, for example). Thus, FIG. 5 shows that there are multiple combinations of turn-on angles and conduction angles that yield essentially the same generated output electrical current. FIG. 6 is a sample of a similar graphical representation of a map that has been constructed in accordance with the method of this invention to show how the amount of the effective phase current varies with various turn-on angles and conduction angles for a particular rotational speed of the rotor 23 relative to the stator 21.

Figure 7:
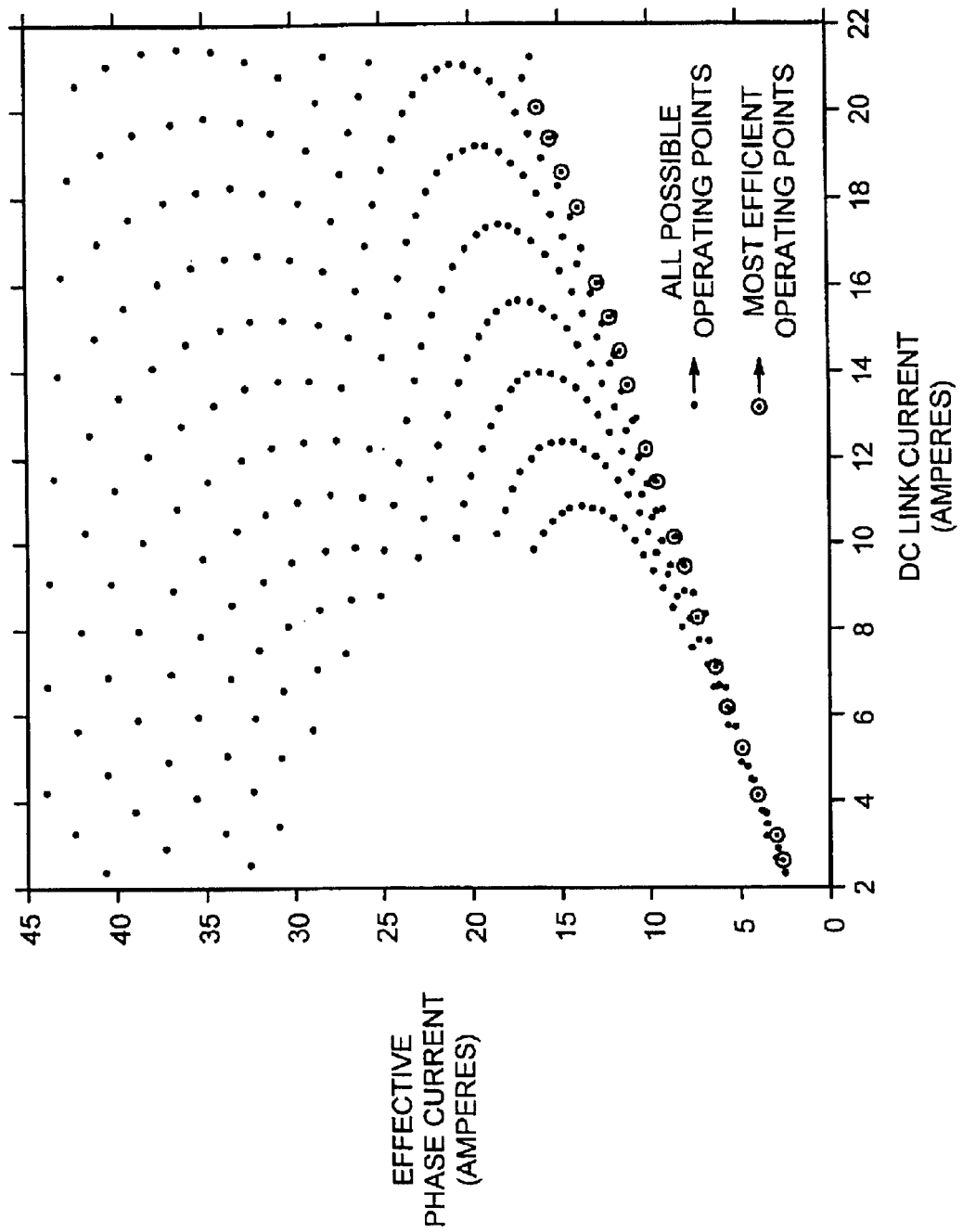
FIG. 7 is a graphical representation of the relationship between the average generated output electrical current and the effective phase current for the simulated operating points illustrated in FIGS. 5 and 6, highlighting some of the optimized operating points.

Because the operating points summarized in the models illustrated in FIGS. 5 and 6 are not optimized, a heuristic selection algorithm can be employed based upon the losses experienced at each operating point. This results in the most efficient conduction angles for the generated output electrical current. FIG. 7 is a sample of a graphical representation of a map that shows the relationship between the average generated output electrical current and the effective phase current for all of the simulated operating points. The optimized operating points for the average generated output electrical current less than 20 amperes have been highlighted.

As mentioned above, the above-described mapping technique can be accomplished relatively quickly and easily by performing a series of computer simulations. However, it has been found to be somewhat difficult to design the computer simulations so as to precisely correlate with the real world structure of the switched reluctance machine 20. This is because it has been found that relatively small variations between the computer model and the real world structure of the switched reluctance machine 20 (and other portions of the generator system 10) can result in undesirable variations in the amount of power that is actually generated by the generator system 10.

Figure 8:
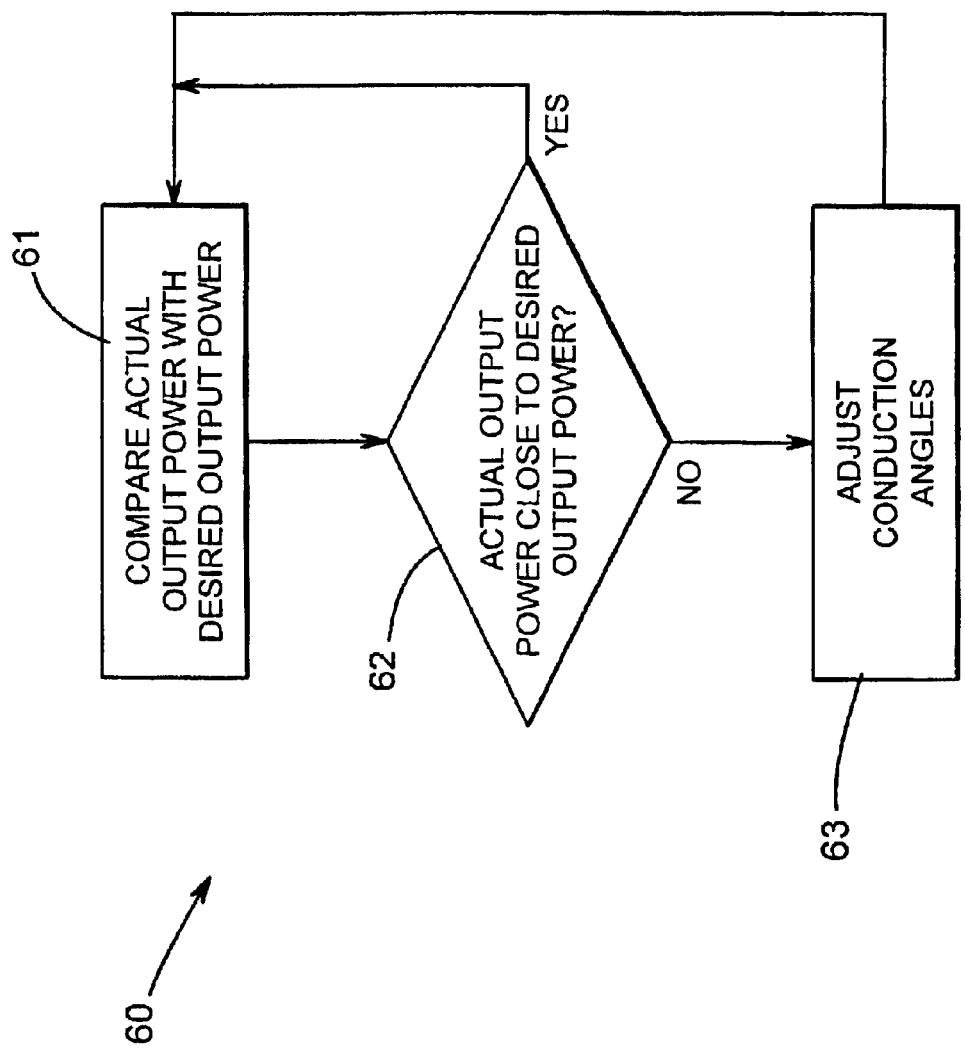
FIG. 8 is a flow chart of a second portion of a method in accordance with this invention for operating the switched reluctance electrical generator system illustrated in FIG. 1.

To compensate for this, the method of this invention contemplates that a feedback loop be provided for comparing the actual output power that is generated by the generator system 10 with a desired reference output power level to insure that such actual output power is maintained at or near the desired output power. FIG. 8 is a flow chart, indicated generally at 60, that illustrates a second portion of a method in accordance with this invention for operating the switched reluctance electrical generator system illustrated in FIG. 1 to accomplish this. In a first step 61 of the method 60, the actual output power generated by the generator system 10 is measured and compared with a desired reference output power level. In a second step 62 of the method 60, a determination is made as to whether the actual output power is equal (or at least sufficiently close) to the desired reference output power level as to warrant compensation. Any desired standard, such as a predetermined percentage or magnitude of voltage, may be used to determine if the actual output power is sufficiently close to the desired reference output power level as to warrant compensation.

If the actual output power is sufficiently close to the desired reference output power level and, therefore, compensation is not warranted, then the method 60 branches from the second step 62 back to the first step 61, wherein the actual output power generated by the generator system 10 is again measured and compared with the desired reference output power level. If, on the other hand, the actual output power is not sufficiently close to the desired reference output power level and, therefore, compensation is necessary, then the method 60 branches from the second step 62 to a third step 63, wherein the conduction angles are adjusted to either increase or decrease the actual output power as necessary. For example, if the actual output power is less than the desired output power, the conduction angles will be adjusted such that the switches remain closed for a longer period of time, thereby increasing the amount of energizing current that is supplied to the windings on the stator 21. If, on the other hand, the actual output power is greater than the desired output power, the conduction angles will be adjusted such that the switches remain closed for a shorter period of time, thereby decreasing the amount of energizing current that is supplied to the windings on the stator 21.

The adjustment of the conduction angles can be accomplished by varying either or both of the turn-on angles and the turn-off angles. To increase the conduction angles, the turn-on angles can be advanced to occur somewhat sooner, the turn-off angles can be delayed to occur somewhat later, or both. Similarly, to decrease the conduction angles, the turn-on angles can be delayed to occur somewhat later, the turn-off angles can be advanced to occur somewhat sooner, or both. Preferably, however, only the turn-on angles are adjusted to adjust the conduction angles. The amount of the adjustment of the conduction angles can be varied in accordance with the magnitude of the difference between the actual output power and the desired output power. In this manner, the actual output power can be controlled to correlate closely with the desired output power.

Figure 9:
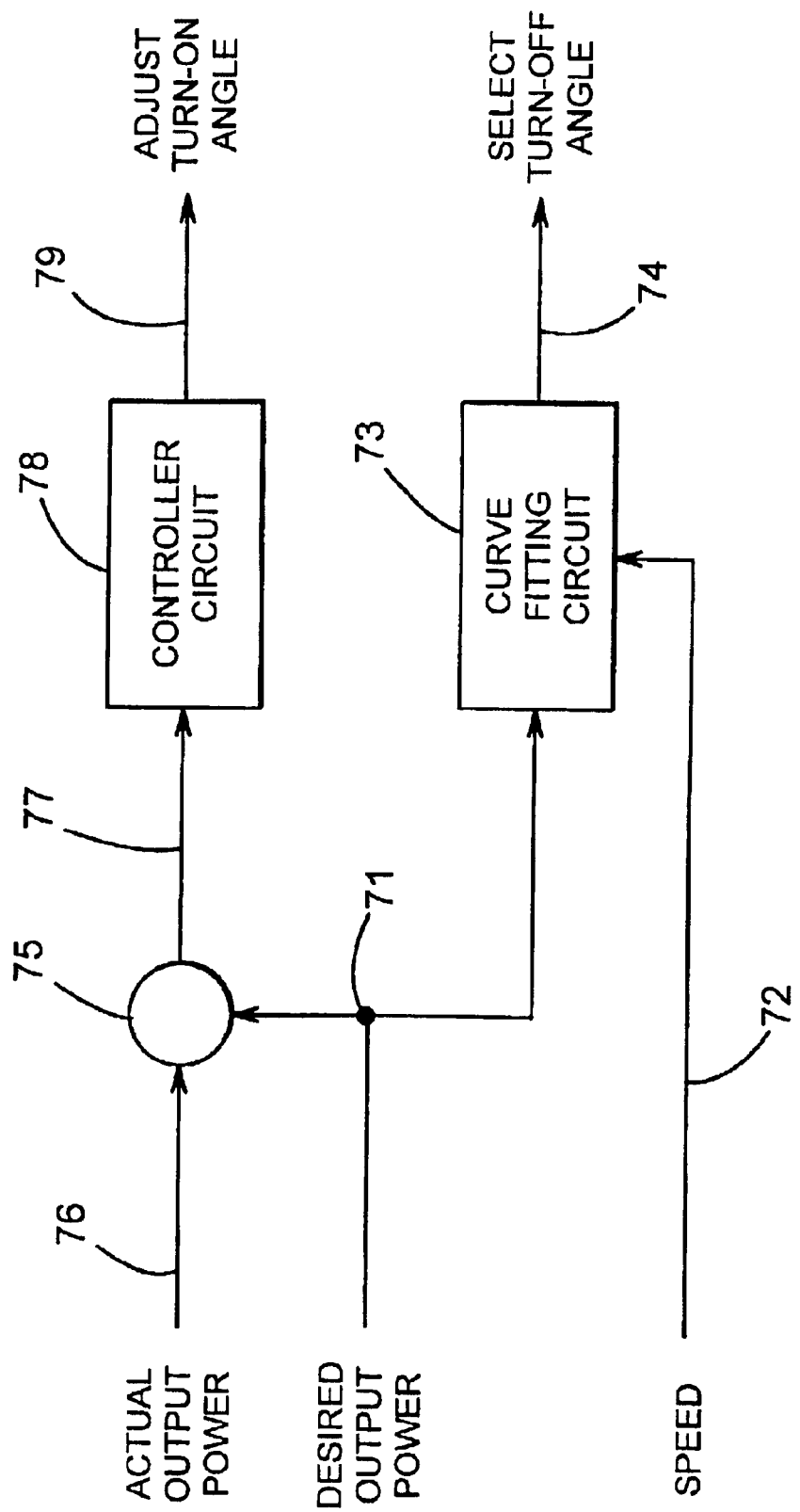
FIG. 9 is a simplified block diagram of a circuit for performing portions of the method of this invention.

FIG. 9 is a simplified block diagram of a circuit, indicated generally at 70, for performing portions of the method of this invention. As shown therein, signals representing the desired output power from the generator system 10 (provided on a line 71) and the speed at which the switched reluctance machine 20 is being operated (provided on a line 72) are delivered to a curve fitting circuit 73. The curve fitting circuit 73 is conventional in the art and is responsive to these signals for determining the desired turn-off angles from the previously mapped operating points. The output signals from the curve fitting circuit 73 are delivered on a line 74 to the controller 40 for controlling the operation of the inverter 30 as described above.

The signal representing the desired output power from the generator system 10 provided on a line 71 is also delivered to a comparator circuit 75, where it is compared with a signal representing the actual output power from the generator system 10 (provided on a line 76). The comparator circuit 75 is conventional in the art and is responsive to these signals for determining the magnitude of the difference therebetween. This difference signal is delivered on a line 77 to a controller circuit 78. The controller circuit 78 is also conventional in the art (a proportional/integral controller) and is responsive to the difference signal for determining if the magnitude of such difference signal is sufficiently large as to warrant adjustment of the conduction angles, as described above. If so, a signal is delivered from the controller circuit 78 on a line 79 to the controller 40 for controlling the operation of the inverter 30 as described above.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for operating a switched reluctance electrical generator system comprising the steps of:
    (a) performing a mapping technique to obtain data relating to a plurality of possible operating conditions of the switched reluctance electrical generator system that generate a desired output power;
    (b) determining the effective phase currents supplied to the switched reluctance electrical generator system for each of those possible operating conditions of the generator;
    (c) selecting the optimum conduction angles as those conduction angles that occur using the smallest effective phase currents supplied to the switched reluctance electrical generator system; and
    (d) operating the switched reluctance electrical generator system using the selected optimum conduction angles.

2. The method defined in claim 1 wherein said step (a) is performed by empirical determination.

3. The method defined in claim 1 wherein said step (a) is performed by computer simulation.

4. The method defined in claim 1 including the further step (e) of comparing the actual output power that is generated by the switched reluctance electrical generator system with a desired reference output power level to insure that such actual output power is maintained at or near the desired output power.

5. The method defined in claim 4 including the further step (f) of adjusting the selected optimum conduction angles in response to said step (e).

6. The method defined in claim 5 wherein said step (f) is performed by adjusting turn-on angles for the selected optimum conduction angles.

7. The method defined in claim 5 wherein said step (f) is performed by adjusting turn-off angles for the selected optimum conduction angles.

* * * * *